United States Patent [19]

Smart

[11] Patent Number: 4,756,661

[45] **Date of Patent: * Jul. 12, 1988**

[54] MOTORIZED OPERATOR UNIT FOR MANUALLY ADJUSTABLE FORK MECHANISM

[76] Inventor: Robert L. Smart, State Route 235 North, New Carlisle, Ohio 45344

[*] Notice: The portion of the term of this patent subsequent to Aug. 25, 2004 has been disclaimed.

[21] Appl. No.: 87,149

[22] Filed: Aug. 19, 1987

Related U.S. Application Data

[63] Continuation of Ser. No. 891,635, Aug. 1, 1986, Pat. No. 4,688,982.

[51] Int. Cl.$^4$ .......... B60P 1/50; B66F 9/14

[52] U.S. Cl. .......... 414/667; 414/671; 414/685

[58] Field of Search .......... 414/607, 608, 667, 664, 414/671, 685, 619–621; 294/67.2, 67.33

[56] References Cited

U.S. PATENT DOCUMENTS

| | | | |
|---|---|---|---|
| 2,339,120 | 1/1944 | Ulinski | 414/667 |
| 2,451,943 | 10/1948 | Gunning | 414/671 |
| 2,483,745 | 10/1949 | Vossenberg | 414/671 |
| 3,424,328 | 1/1969 | Gideonsen et al. | 414/667 X |
| 3,974,927 | 8/1976 | Schuster | 414/667 |
| 4,239,446 | 12/1980 | Vucinic | 414/607 X |
| 4,280,781 | 7/1981 | Bodin | 414/671 |
| 4,381,166 | 4/1983 | Smart | 414/667 X |
| 4,607,997 | 8/1986 | Asano | 414/667 |
| 4,688,982 | 8/1987 | Smart | 414/667 |

FOREIGN PATENT DOCUMENTS 2726147 12/1978 Fed. Rep. of Germany ...... 414/667

OTHER PUBLICATIONS

Case, Forklift Model 584/5/6 E Series (Form No. UD13485), Undated.

Case, Uni–Loader Model 1845C (Form No. UD12785), Undated.

Case, W4 Loader, (Form No. UD93282), Undated.

Forks, Undated brochure.

Grapples (LLG–LOG and Lumber Grapples, Undated brochure.

Forged (Solid Steel) Bucket Forks, Undated brochure.

*Primary Examiner*—Joseph E. Valenza

*Assistant Examiner*—David A. Bucci

*Attorney, Agent, or Firm*—Jacox & Meckstroth

[57] ABSTRACT

A motorized operator unit which is readily attachable to a conventional manually adjustable fork mechanism for adjustment of the forks by operation of a motor. The operator unit comprises support structure which supports a pair of elongate threaded rods. Each threaded rod has a pair of nuts threadedly attached thereto. A motor is operatively connected to the threaded rods for rotation thereof. Retainer members are attached to the nuts and prevent rotation thereof. The retainer members move with movement of the nuts along the threaded rods. The operator unit is adapted to be quickly attached to a carriage of a conventional manually adjustable fork mechanism, with the retainer members in engagement with the forks of the mechanism for movement of the forks.

8 Claims, 4 Drawing Sheets

MOTORIZED OPERATOR UNIT FOR MANUALLY ADJUSTABLE FORK MECHANISM

RELATED APPLICATION

This application is a continuation of U.S. patent application Ser. No. 891,635, filed Aug. 1, 1986, now U.S. Pat. No. 4,688,982.

BACKGROUND OF THE INVENTION

Conventional fork lift mechanisms are provided with forks which are in spaced-apart relationship. The spacing between the forks in the unit is manually adjustable.

It is an object of this invention to provide a quick attachment motorized operator unit for a conventional fork mechanism so that the forks of the mechanism are adjustable by means of the operator unit. Thus, the forks of the mechanism can be operatively adjusted as desired to engage an object at the underside thereof or to grasp an object at opposite portions thereof, for lifting the object.

It is another object of this invention to provide such a quick attachment motorized operator unit which may be easily and readily attached permanently or temporarily to a conventional fork mechanism for adjustment of the forks of the mechanism.

Other objects and advantages of this invention reside in the construction of parts, the combination thereof, the method of construction and the mode of operation, as will become more apparent from the following description.

Prior Art

This invention is related to that disclosed in U.S. Pat. No. 4,381,166, issued to the inventor herein.

The apparatus shown and claimed in U.S. Pat. No. 4,381,166 comprises a carriage which includes permanently mounted motorized apparatus within the carriage and connected to the forks for adjustment of the forks which are carried by the carriage. The carriage is fixedly attached to hoist apparatus of an industrial tractor, or other vehicle or the like. Thus, the tractor has a carriage in which the forks are adapted to be adjusted by motor means, and the carriage has a motor mechanism therewithin for operation of the forks. In distinction, the apparatus of this invention comprises a motor operated unit which is easily and readily attachable to a carriage which has conventional manually adjustable fork mechanism.

SUMMARY OF THIS INVENTION

A motorized operator unit of this invention comprises support structure which is easily and readily attachable and detachable as a module to a carriage which has manually adjustable forks. Thus, the forks are adjustable by motor operation.

Rotatably carried by the support structure are a plurality of rotatable threaded rods. Mounted upon each threaded rod are a plurality of nuts. A plurality of retainer members are attached to the nuts. Each retainer member is attached to a nut of each of the threaded rods. Thus, the nuts cannot rotate, but the nuts travel along the threaded rods with rotation of the threaded rods. The nuts carry therewith the retainer members. A motor is operably joined to the threaded rods for rotation thereof. The motor is preferably a fluid operated motor.

The support structure is adapted to be readily mounted upon or within a carriage having conventional manually adjustable forks. Each retainer member is adapted to retain a fork of the fork mechanism. Thus, the fork operator unit of this invention adjustably moves the forks upon the carriage with operation of the motor.

DETAILED DESCRIPTION OF THE INVENTION

Figure 1:
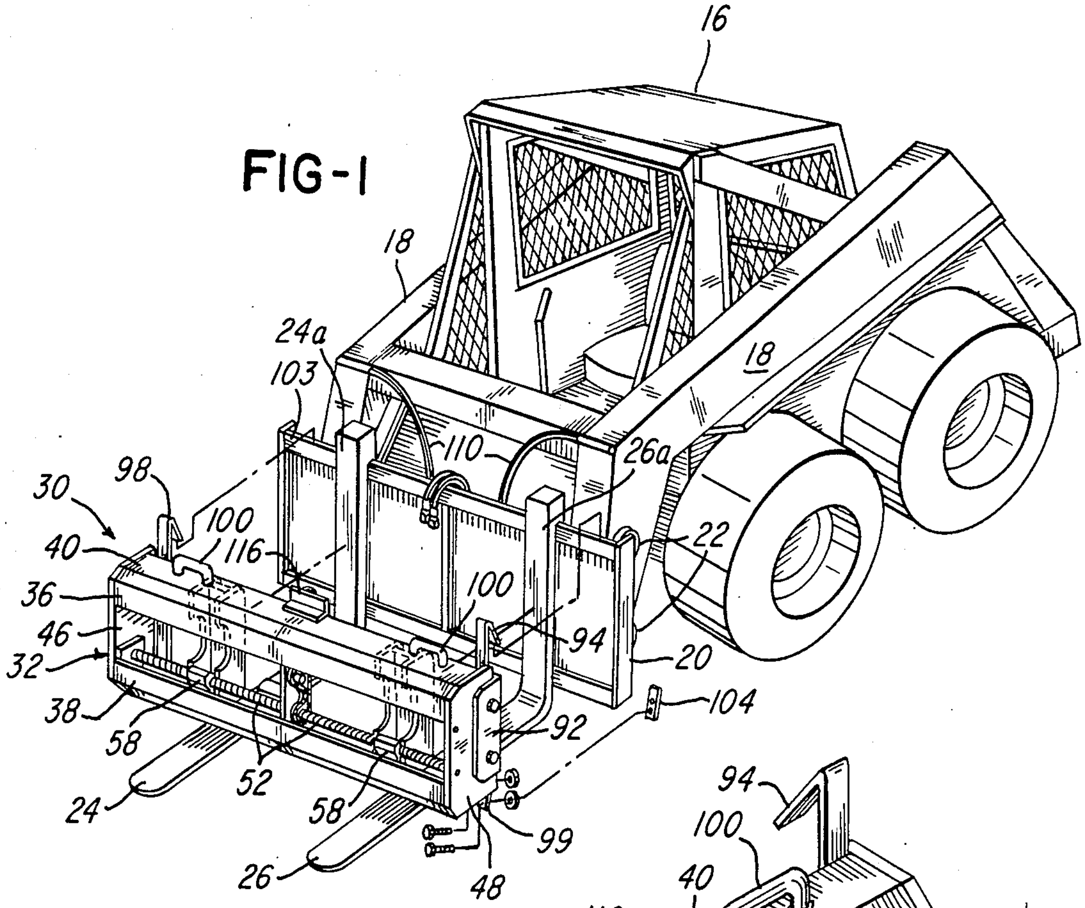
FIG. 1 is a perspective exploded view showing a tractor provided with a carriage having fork mechanism which is manually adjustable. This figure also illustrates the manner in which an operator unit of this invention is readily attached to the fork mechanism for motor adjustment of the forks.
Figure 2:
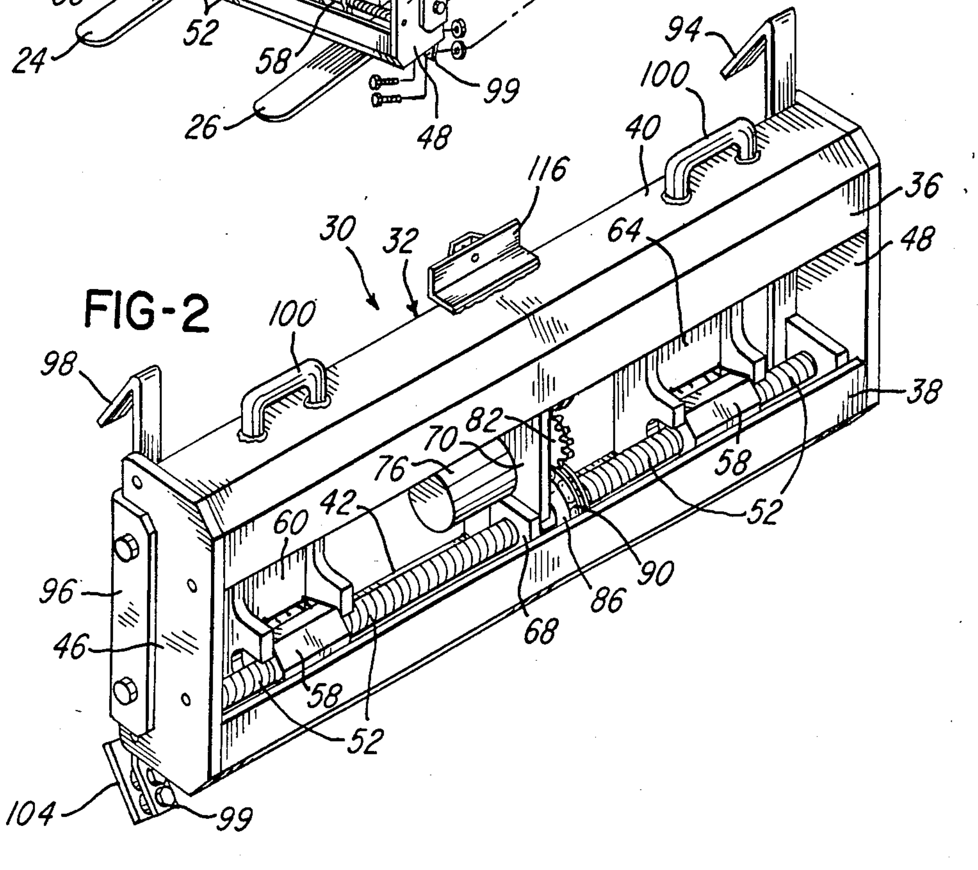
FIG. 2 is a perspective view, drawn on a larger scale than FIG. 1, showing an operator unit of this invention.
Figure 3:
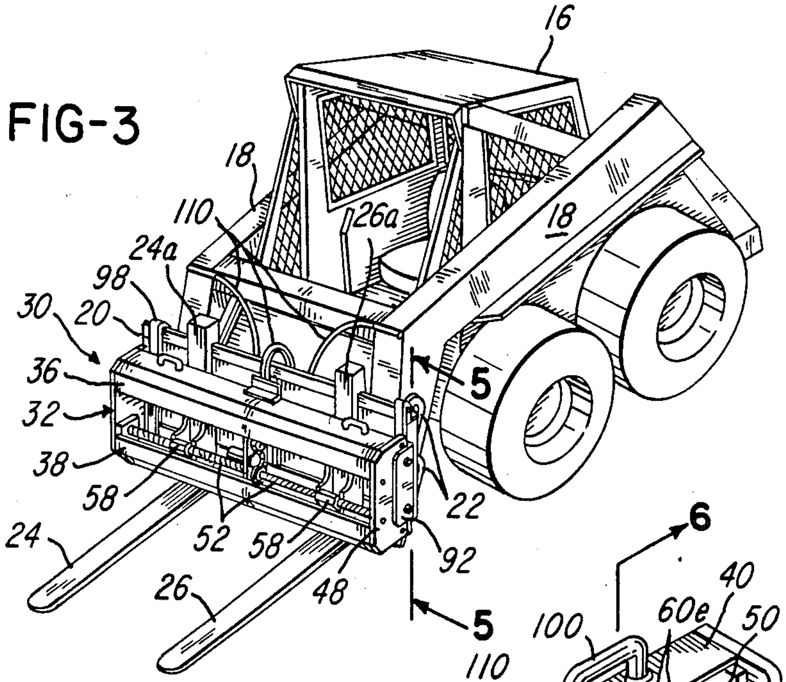
FIG. 3 is a perspective view, drawn on a slightly smaller scale than FIG. 1, showing an operator unit of this invention attached to the carriage and fork mechanism shown in FIG. 1 for motor operation of the forks.
Figure 4:
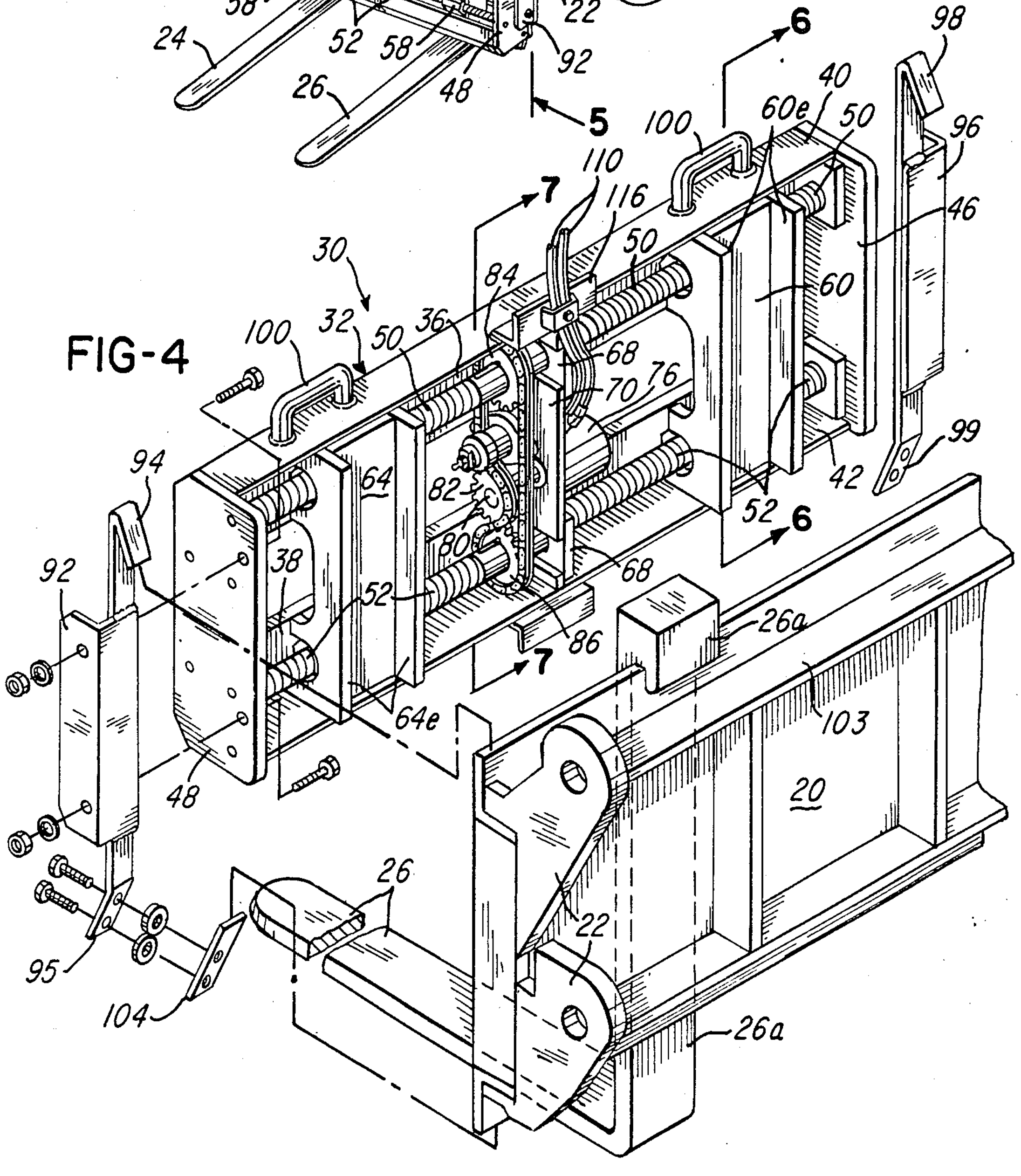
FIG. 4 is a perspective exploded view, drawn on substantially the same scale as FIG. 2, of an operator unit of this invention.

FIGS. 1 and 3 illustrate a tractor 16, which is provided with extending support arms 18. The arms 18 are pivotally movable to raise and to lower the front portions of the arms 18. A carriage 20 is attached to the front portions of the arms 18 by means of lugs 22. Mounted upon the carriage 20 are forks 24 and 26. The fork 24 has an upwardly extending part 24*a* which is supported by the upper part of the carriage 20. The fork 26 has an upwardly extending part 26*a* which is supported by the upper part of the carriage 20. The forks 24 and 26 are adapted to be manually adjusted upon the carriage 20.

A fork operator unit 30 of this invention comprises support structure 32. The support structure 32 is provided with front wall members 36 and 38, an upper frame member 40 and a lower frame member 42. Attached to the front wall members 36 and 38 and to the upper and lower frame members 40 and 42 are end frame members 46 and 48. Rotatably supported by the end frame members 46 and 48 and extending therebetween are threaded rods 50 and 52.

Figure 6:
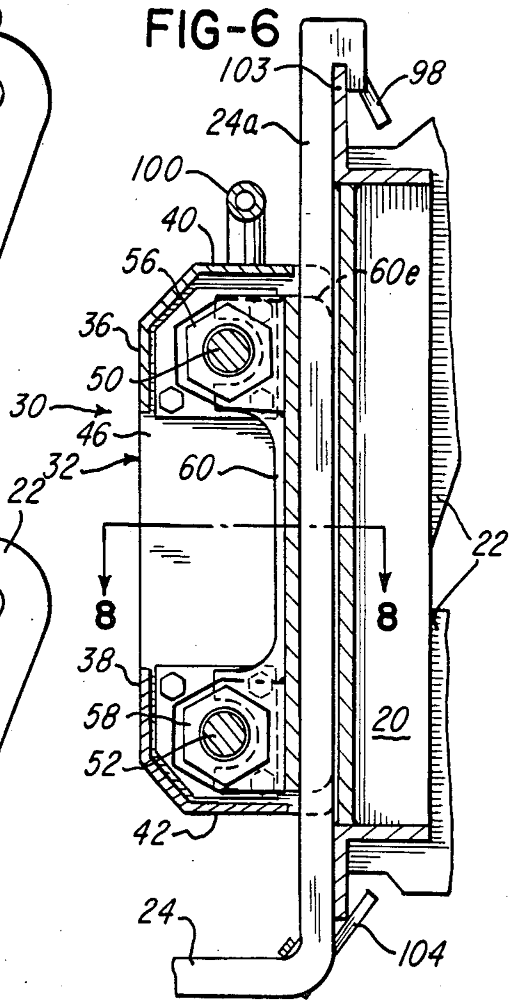
FIG. 6 is an enlarged sectional view taken substantially on line 6—6 of FIG. 4.

Encompassing the threaded rod 50 and threadedly attached thereto are nuts 56, which are normally positioned in spaced-apart relationship. Enccompassing the threaded rod 52 and threadedly attached thereto are nuts 58, which are also positioned in spaced-apart relationship. A retainer 60 closely encompasses and is attached to one of the nuts 56 on the threaded rod 50, and the retainer 60 also encompasses and is attached to a nut 58 on the threaded rod 52, as best shown in FIG. 6. A retainer 64 closely encompasses and is attached to the other nut 56 on the threaded rod 50, and the retainer 64 also encompasses and is attached to the other nut 58 on the threaded rod 52. The retainer 60 has spaced-apart vertically extending engagement portions 60*e*. The retainer 64 has spaced-apart engagement portions 64*e*. The retainers 60 and 64 maintain the nuts 56 and 58 against rotation. However, the nuts 56 and 58 move along the threaded rods 50 and 52 with rotation thereof.

The threaded rods 50 and 52 are rotatably supported at the midportions thereof by bearing members 68, which are attached to a support member 70. The support member 70 is attached to the front walls 36 and 38 and to the upper and lower frame members 40 and 42. The support member 70 supports a rotary motcr 76, which is shown herein as being a fluid operated motor.

Preferably, the threaded rods 50 and 52 have threads in a clockwise direction between the intermediate support members 70 and the end frame member 46, and the threaded rods 50 and 52 have threads in a counterclockwise direction between the intermediate support member 70 and the end frame member 48. Thus, the nuts 56 and 58 which are attached to the clockwise threads and the nuts 56 and 58 which are attached to the counterclockwise threads move in opposite directions with rotation of the threaded rods 50 and 52.

Figure 7:
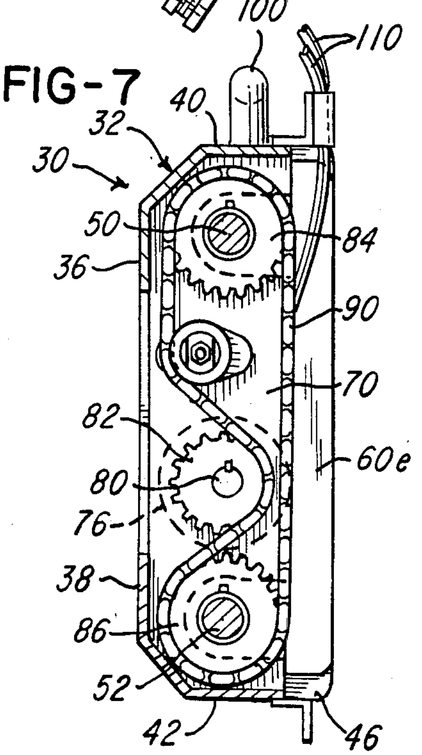
FIG. 7 is an enlarged sectional view taken substantially on line 7—7 of FIG. 4.
Figure 8:
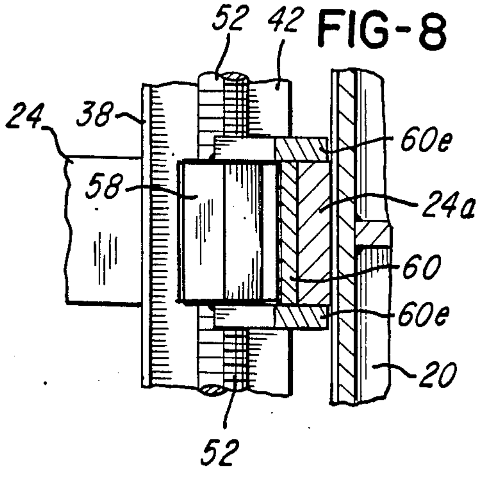
FIG. 8, is a fragmentary sectional view taken substantially on line, 8—8 of FIG. 6.

The motor 76 has a shaft 80 extending therefrom and through the intermediate support member 70. Attached to the shaft 80 for rotation therewith is a toothed wheel 82. Attached to the threaded rod 50, is a toothed wheel 84. Attached to the threaded rod 52 is a toothed wheel 86. Encompassing the toothed wheels 84 and 86 and in meshed relationship therewith and in meshed relationship with the toothed wheel 82 is a drive chain 90, as best shown in FIG. 7.

A bracket 92 is attached to the end frame member 48 and has a hook member 94 secured thereto and extending upwardly therefrom. Attached to the bracket 92 and extending downwardly therefrom is a connector member 95. A bracket 96 is attached to the end frame member 46 and has a hook member 98 secured thereto and extending upwardly therefrom. Attached to the bracket 96 and extending downwardly therefrom is a connector member 99. Handle members 100 are attached to the upper frame member 40.

OPERATION

Figure 5:
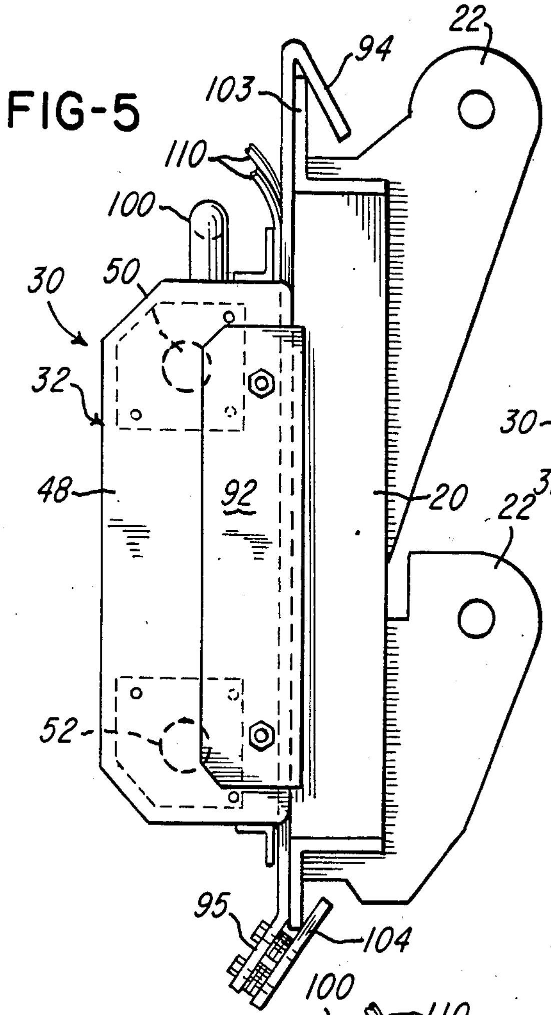
FIG. 5 is an enlarged elevational view taken substantially on line 5—5 of FIG. 3.

As illustrated in FIG. 1, the fork operator unit 30 is adapted to be positioned upon the carriage 20. The fork operator unit 30 is adapted to be lifted manually by means of the handles 100 and moved to the carriage 20. The hook members 94 and 98 are hooked over a cross member 103 at the upper part of the carriage 20, and the connector members 95 and 99 are clamped by means of clamps 104 to the lower part of the carriage 20, as best shown in FIG. 5.

As the fork operator unit 30 is moved to the carriage 20, the engagement portions 60*e* of the retainer 60 are positioned at the sides of the upwardly extending part 24*a* of the fork 24, and the engagement portions 64*e* of the retainer 64 are positioned at the sides of the upwardly extending part 26*a* of the fork 26. Thus, the retainer members 60 and 64 partially encompass the upwardly extending portions 24*a* and 26*a* of the forks 24 and 26, respectively.

Fluid conduit lines 110, which extend from a fluid pump, not shown, carried by the tractor 16, are adapted to be connected to the motor 76 for operation thereof. If desired, a bracket 116 may be attached to the upper frame member 40 to support a portion of the fluid conduits 110.

Thus, with operation of the motor 76 the retainer members 60 and 64 are moved, and the retainer members 60 and 64 move the forks 24 and 26 with respect to the carriage 20. The arms 18, to which the carriage 20 is attached, move the carriage 20 upwardly and downwardly.

Figure 9:
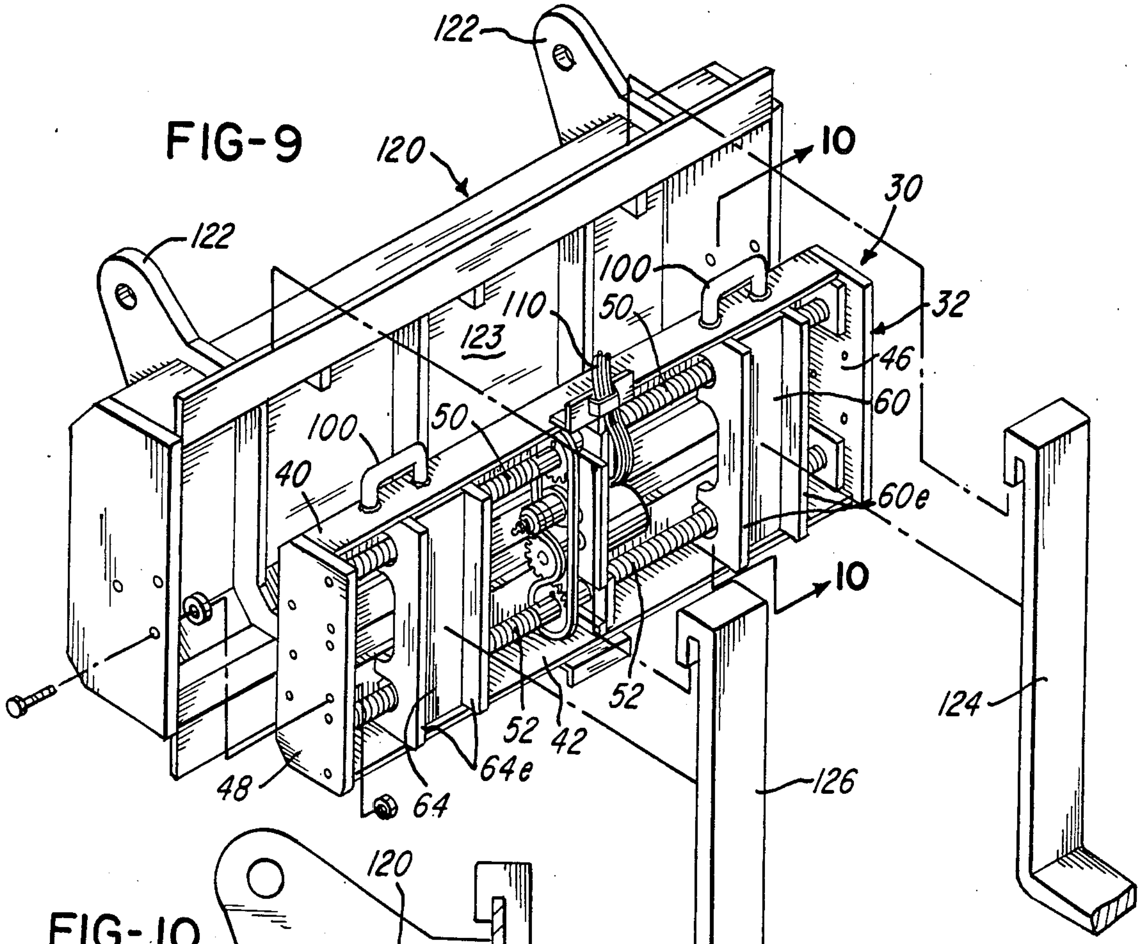
FIG. 9 is an exploded view drawn on substantially the same scale as FIG. 2, illustrating the manner of attachment of an operator unit of this invention to a carriage which is different from the carriage shown in FIGS. 1 and 3.
Figure 10:
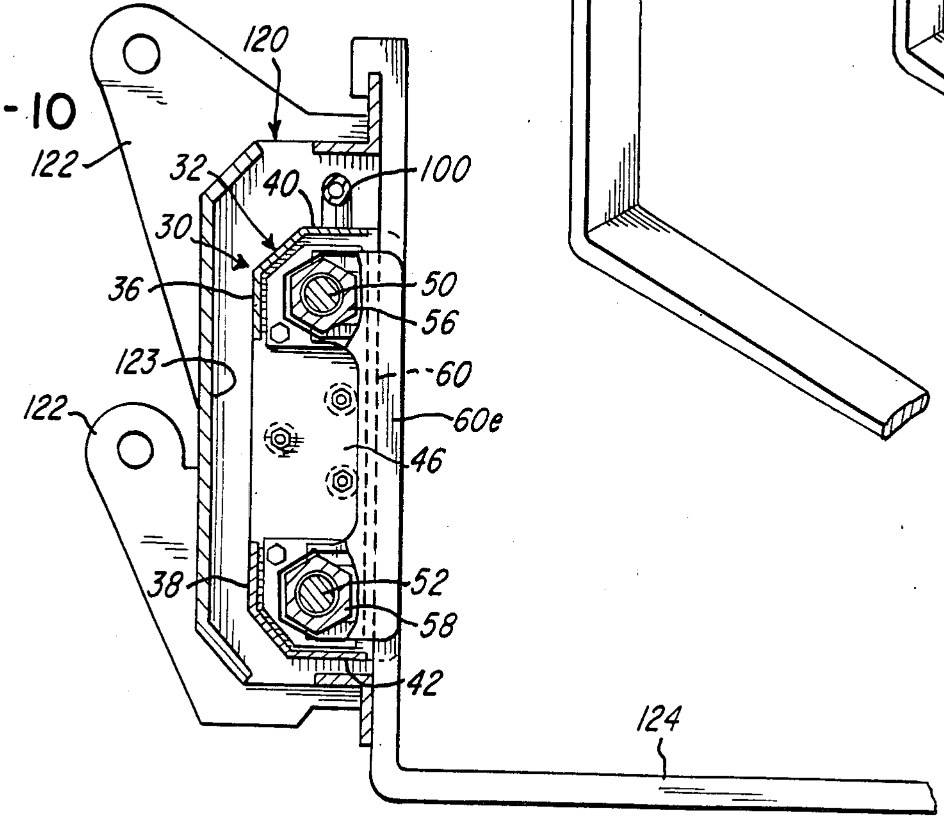
FIG. 10 is an enlarged sectional view taken substantially on line 10—10 of FIG. 9.

FIGS. 9 and 10

FIGS. 9 and 10 show a carriage 120 adapted to be attached by means of lugs 122 to arms, such as the arms 18 shown in FIGS. 1 and 3. The carriage 120 has a recess 123 therein. FIGS. 9 and 10 illustrate the positioning of a fork operator unit 30 of this invention within the recess 123 of the carriage 120. After the operator unit 30 is positioned within the recess 123, forks 124 and 126 of the carriage 120 are hooked over the upper part of the carriage 120. The forks 124 and 126 are positioned between the engagement parts 60*e* and 64*e* of the retainer members 60 and 64 of the operator unit 30. Thus, movement of the retairer members 60 and 64 by operation of the motor 76 moves the forks 124 and 126 with respect to the carriage 120. The arms 18 of the tractor 16 which supports the carriage 120, are adapted to move the carriage 120 upwardly and downwardly.

Although the preferred embodiment of the fork operator unit of this invention has been described, it will be understood that within the purview of this invention various changes may be made in the form, details, proportion and arrangement of parts, the combination thereof, and the mode of operation, which generally stated consist in a fork operator unit of this invention within the scope of the appended claims.

The invention having thus been described, the following is claimed:

1. An operator unit for quick attachment to and detachment from a carriage which is supported by a machine which is provided with a hoist mechanism to which the carriage is attached for upward and downward movement of the carriage, and in which the carriage supports forks which are adapted to be manually adjustable, comprising:

support structure, elongate guide means supported by the support structure, a plurality of fork retainer members, each fork retainer member being movable along the elongate guide means, motor means, connector means connecting the motor means to the fork retainer members for movement of the fork retainer members along the guide means, and means for releasably attaching the support structure to the carriage, each fork retainer member being positioned in engagement with a fork which is supported by the carriage, for lateral movement of the forks with operation of the motor means.

2. The operator unit of claim 1 in which the elongate guide means comprises a rod member which is carried by the support structure and which supports the fork retainer members for adjustment with respect to the support structure.

3. The operator unit of claim 1 in which the elongate guide means comprises a threaded rod which is rotatably supported by the support structure, a pair of nuts threadedly attached to the threaded rod and movable therealong with rotation of the threaded rod, each of the nuts being attached to one of the fork retainer members, the connector means including means for rotation of the threaded rod for movement of the nuts and for movement of the fork retainer members.

4. An operator unit for quick attachment to and detachment from a carriage which is supported by a machine which is provided with a hoist mechanism to which the carriage is attached for upward and downward movement of the carriage, and in which the carriage supports a fork which is adapted to be manually adjustable, comprising:

support structure, elongate guide means supported by the support structure, a fork retainer member, the fork retainer member being movable along the elongate guide means, motor means, connector means connecting the motor means to the fork retainer member for movement of the fork retainer member along the guide means, and means for releasably attaching the support structure to the carriage, the fork retainer member being positioned in engagement with a fork which is supported by the carriage, for lateral movement of the fork with operation of the motor means.

5. The operator unit of claim 4 in which the guide means comprises a rod member which is carried by the support structure and which supports the fork retainer member for movement with respect to the support structure.

6. An operator unit for lateral movement of forks which are supported by a carriage which is supported by a machine which is provided with a hoist mechanism to which the carriage is attached for upward and downward movement of the carriage, the forks being adapted to be manually laterally movable upon the carriage, comprising:

support structure, a threaded rod rotatably supported by the support structure, a pair of nuts threadedly attached to the threaded rod, a pair of fork retainer members, each fork retainer member being in engagement with a nut of the threaded rod and preventing rotation of the nut engaged thereby, the retainer members thus being movable along the threaded rod with rotation thereof, motor means, connector means connecting the motor means to the threaded rod for rotation thereof, and means for quick attachment of the support structure to the carriage, with each fork retainer member being in engagement with a fork which is supported by the carriage, for lateral movement of the forks with operation of the motor means.

7. The operator unit of claim 6 in which the connector means includes a pair of toothed wheels, there being a toothed wheel attached to each of the threaded rods, the motor means including a rotary shaft, a toothed wheel attached to the rotary shaft of the motor means, a chain in meshed engagement with all of the toothed wheels for rotation of the threaded rods with rotation of the rotary shaft of the motor means.

8. An operator unit for quick attachment to and detachment from a carriage which is supported by a machine which is provided with a hoist mechanism to which the carriage is attached for upward and downward movement of the carriage, and in which the carriage supports forks which are adapted to be manually adjustable, comprising:

support structure, a pair of elongate guide members supported by the support structure, a plurality of fork retainer members, each fork retainer member being movable along the elongate guide members, rotary motor means, connector means connecting the rotary motor means to the fork retainer members for movement of the fork retainer members along the elongate guide members, and means for releasably attaching the support structure to the carriage, each fork retainer member being positioned in engagement with a fork which is supported by the carriage, for lateral movement of the forks with operation of the motor means.

* * * * *